(12) United States Patent
Lin

(10) Patent No.: US 7,375,759 B2
(45) Date of Patent: May 20, 2008

(54) DIGITAL IMAGE CAPTURING APPARATUS CAPABLE OF CAPTURING IMAGES FROM DIFFERENT DIRECTIONS

(75) Inventor: Yu-Chieh Lin, Taipei (TW)

(73) Assignee: Transpacific Plasma, LLC, Taipei (TW)

( * ) Notice: Subject to any disclaimer, the term of this patent is extended or adjusted under 35 U.S.C. 154(b) by 0 days.

(21) Appl. No.: 10/707,949

(22) Filed: Jan. 27, 2004

(65) Prior Publication Data

US 2005/0068460 A1   Mar. 31, 2005

(30) Foreign Application Priority Data

Sep. 29, 2003   (TW) ............... 92126897 A

(51) Int. Cl.
- H04N 5/225   (2006.01)
- G03B 15/03   (2006.01)
- G03B 15/06   (2006.01)
- H04N 9/04    (2006.01)

(52) U.S. Cl. ............ 348/371; 348/340; 348/344; 348/376; 348/374; 396/176; 396/200

(58) Field of Classification Search ......... 348/335, 348/340, 343, 371, 373–374, 376, 207.99, 348/344, 552; 396/176, 199, 200
See application file for complete search history.

(56) References Cited

U.S. PATENT DOCUMENTS

| | | | | |
|---|---|---|---|---|
| 5,345,260 A | * | 9/1994 | Petralia | 348/98 |
| 5,389,966 A | * | 2/1995 | Ikari et al. | 348/98 |
| 5,619,253 A | * | 4/1997 | Miranda et al. | 348/14.1 |
| 6,002,430 A | * | 12/1999 | McCall et al. | 348/207.99 |
| 6,023,590 A | * | 2/2000 | Abe et al. | 396/429 |
| 6,278,845 B1 | * | 8/2001 | Terada | 396/175 |
| 6,426,776 B1 | * | 7/2002 | Ochi | 348/370 |
| 6,532,035 B1 | * | 3/2003 | Saari et al. | 348/14.02 |
| 6,700,617 B1 | * | 3/2004 | Hamamura et al. | 348/351 |
| 6,809,772 B1 | * | 10/2004 | Motta et al. | 348/341 |
| 6,822,685 B1 | * | 11/2004 | Kaneko | 348/335 |

(Continued)

FOREIGN PATENT DOCUMENTS

| | | |
|---|---|---|
| JP | 11-149107 | 6/1999 |
| JP | 2002-300438 | 10/2002 |
| JP | 2003-091041 | 3/2003 |

OTHER PUBLICATIONS http://www.macdirectory.com/newmd/mac/pages/reviews/-MinolataX20/ Jan. 21, 2005.

(Continued)

*Primary Examiner*—Ngoc-Yen Vu
*Assistant Examiner*—Carramah J Quiett
(74) *Attorney, Agent, or Firm*—Workman Nydegger

(57) ABSTRACT

A digital image capturing apparatus includes a housing, a first hole installed on the front side of the housing for inputting light from the front, a second hole installed on the rear side of the housing for inputting light from the rear, a reflector module installed in the housing for reflecting the light input from the first hole or the second hole, a photosensor installed in the housing for sensing the light from the reflector module, and an image generating module installed in the housing for generating an image according to the light sensed by the photosensor.

16 Claims, 22 Drawing Sheets

U.S. PATENT DOCUMENTS

| | | | |
|---|---|---|---|
| 6,917,385 B1* | 7/2005 | Narabu | 348/340 |
| 2003/0036365 A1* | 2/2003 | Kuroda | 455/90 |
| 2004/0048633 A1* | 3/2004 | Sato et al. | 455/556.1 |
| 2004/0114043 A1* | 6/2004 | Belliveau | 348/207.99 |

OTHER PUBLICATIONS http://kmpi.konicaminolta.us/eprise/main/kmpi/content/cam_product_pages/DiMAGE_... Jan. 21, 2005.

http://www.dpreview.com/reviews/specs/Sony/sony_dscf55v.asp Jan. 21, 2005.

* cited by examiner

DIGITAL IMAGE CAPTURING APPARATUS CAPABLE OF CAPTURING IMAGES FROM DIFFERENT DIRECTIONS

BACKGROUND OF INVENTION

1. Field of the Invention

The present invention relates to a digital image capturing apparatus, and more specifically, to a digital image capturing apparatus capable of capturing images from different directions.

2. Description of the Prior Art

As the information industry progresses, information-related products are increasingly used in daily life and conventional analog products are gradually being replaced by digital products. Take the digital camera for example; conventional film cameras utilize chemicals on a film to record images, which can be viewed after development. Moreover, if a user wants to take pictures with special effects, they are required to be skillful in controlling the stop, the shutter as well as the lens and film development, which is inconvenient for an amateur. In contrast to conventional film cameras, digital cameras convert images into digital signals using a photosensor to directly store them in a memory device. Digital cameras can also be connected to a computer system and store images on its hard disk drive. The images can then be viewed on a screen or printed on a printer. In addition, the user can further process the images recorded by the digital camera using image processing software to produce special effects, which previously could only be realized by a professional photographer with a conventional optical camera, or perhaps even could not be achieved using a conventional optical camera.

Please refer to FIG. 1 showing a front view, and FIG. 2 showing a rear view of a conventional digital camera 10. The digital camera 10 includes a lens 12 for capturing light reflected by an object, a shutter button 16 for controlling focusing and shooting, a viewfinder 18, which can be a liquid crystal display (LCD) or a low temperature polysilicon (LTPS) display, for viewing the object, and a control button set 20 for controlling image editing, browsing and parameter settings.

Please refer to FIG. 3 showing a block diagram of the conventional digital camera 10. The digital camera 10 further includes a photosensor 24 and an image generating module 26. The photosensor 24 can be a charge coupled device (CCD) for sensing light from the lens 12, and the image generating module 26 is for generating an image according to the light sensed by the photosensor 24 so that the viewfinder 18 can display the image.

When taking a picture of an object, the lens 12 should be turned toward the object, and the user is only able to view the object by the viewfinder 18. If the user wants themselves to be in the picture, they can use a tripod along with a self-timer of the camera, or have someone take the picture for them. However, neither of these methods convenient.

Please refer to FIG. 22 showing another conventional digital camera 150. Components in FIG. 22 having the same number as that in FIG. 1 function in the same way, thus a further description is hereby omitted. What is different is that a viewfinder 158 is attached to the digital camera 150 by a hinge 152, so that the user can view themselves using the viewfinder 158. However, the hinge 152 not only has a high cost, but is also highly susceptible to damage.

SUMMARY OF INVENTION

It is therefore a primary objective of the present invention to provide a digital image capturing apparatus capable of capturing images from different directions, including taking a picture of the user themselves.

Briefly summarized, a digital image capturing apparatus includes a housing, a first hole installed on the front side of the housing for inputting light from the front, a second hole installed on the rear side of the housing for inputting light from the rear, a reflector module installed in the housing for reflecting the light input from the first hole or the second hole, a photosensor installed in the housing for sensing the light from the reflector module, and an image generating module installed in the housing for generating an image according to the light sensed by the photosensor.

The present invention further provides a digital image capturing apparatus including a housing, a lens installed on the housing, being capable of moving back and forth for inputting light from the front or from the rear of the housing, a reflector module installed in the housing for reflecting the light input from the lens, a lens group installed on a side of the reflector module for focusing the light from the reflector module, a photosensor installed in the housing for sensing the light from the lens group, and an image generating module installed in the housing for generating an image according to the light sensed by the photosensor.

It is an advantage of the present invention that the user can take a picture of themselves without any help from others.

It is another advantage that the present invention uses the reflector module to adjust the focus of the light from the first hole or the second hole, so that the lens group can be installed on the right or left side of the digital image capturing apparatus instead of the backside, thus the thickness of the digital image capturing apparatus is reduced.

It is another advantage that the present invention uses the reflector module to enable self-capturing instead of an inexpensive hinge.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
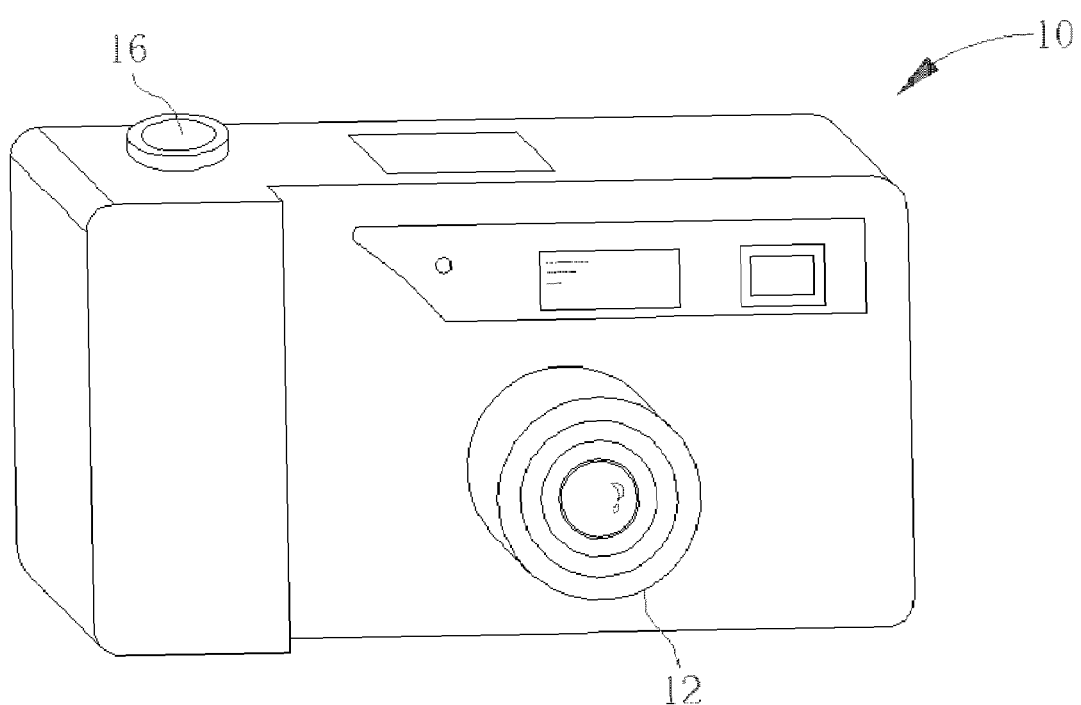
FIG. 1 is a front view of a conventional digital camera.
Figure 2:
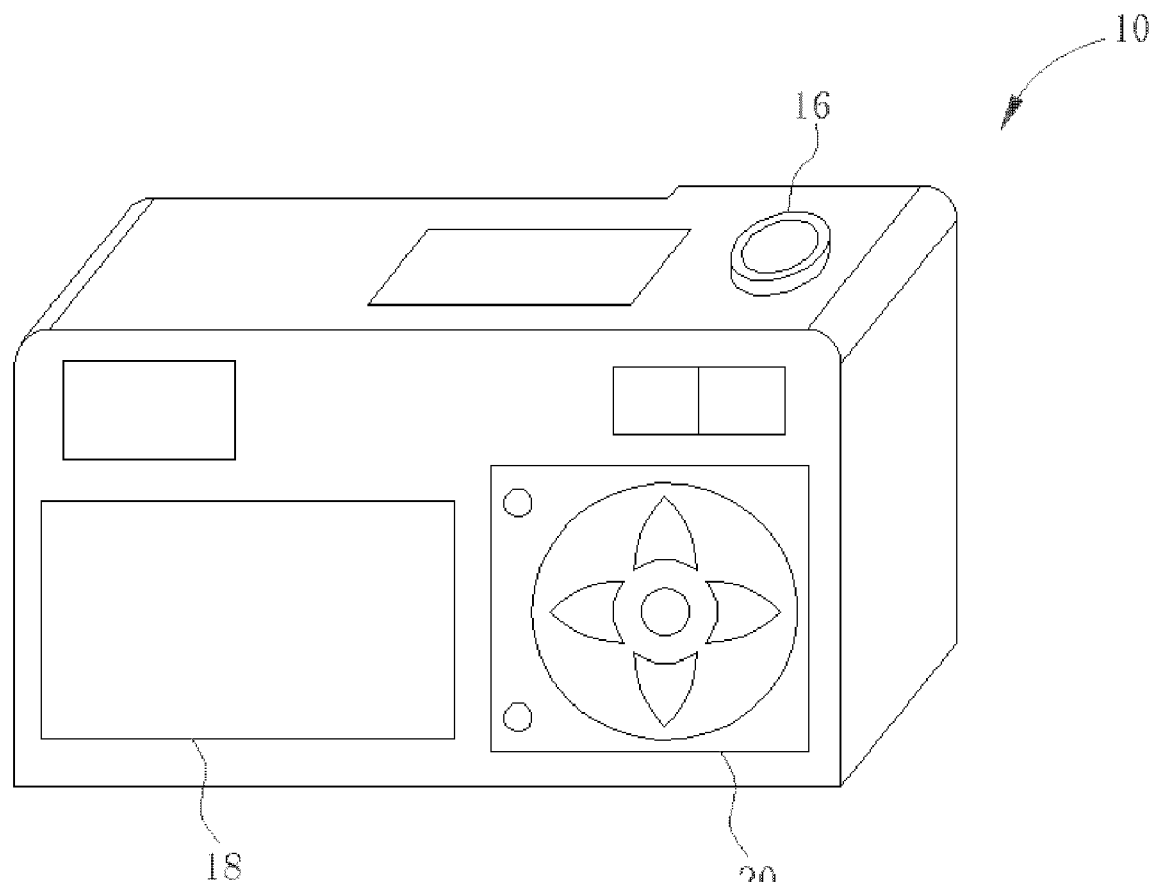
FIG. 2 is a rear view of a conventional digital camera.
Figure 3:
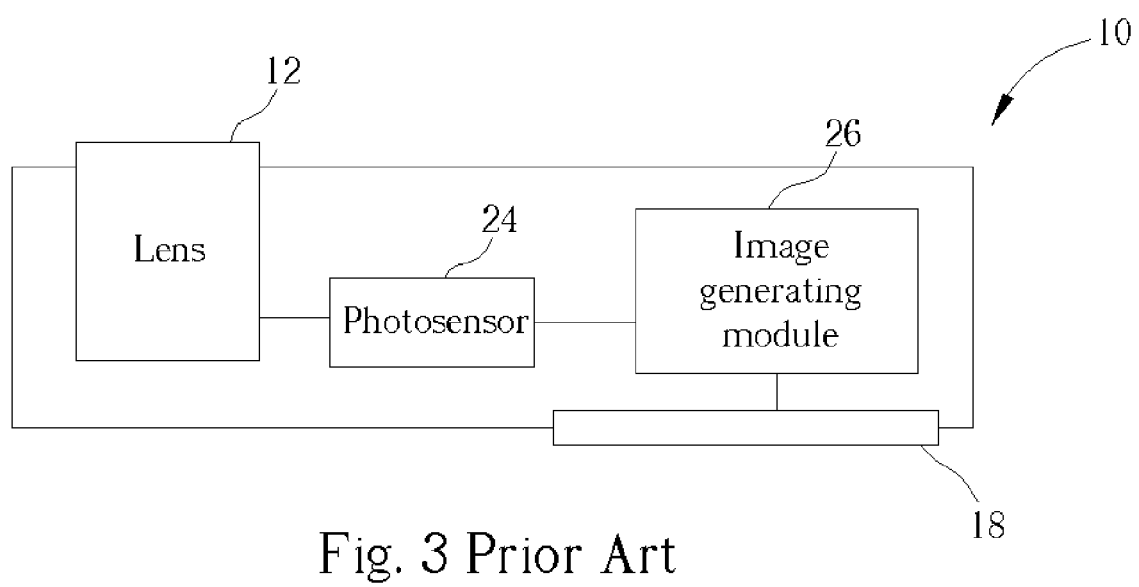
FIG. 3 is a block diagram of the conventional digital camera.
Figure 4:
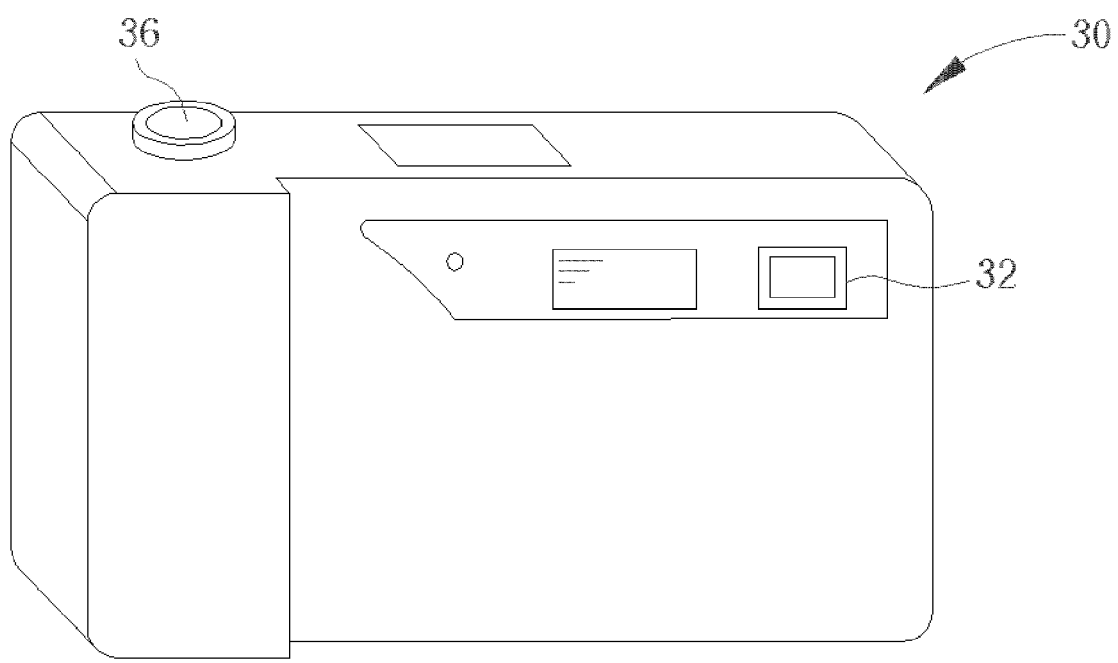
FIG. 4 is a front view of a digital camera according to the present invention.
Figure 5:
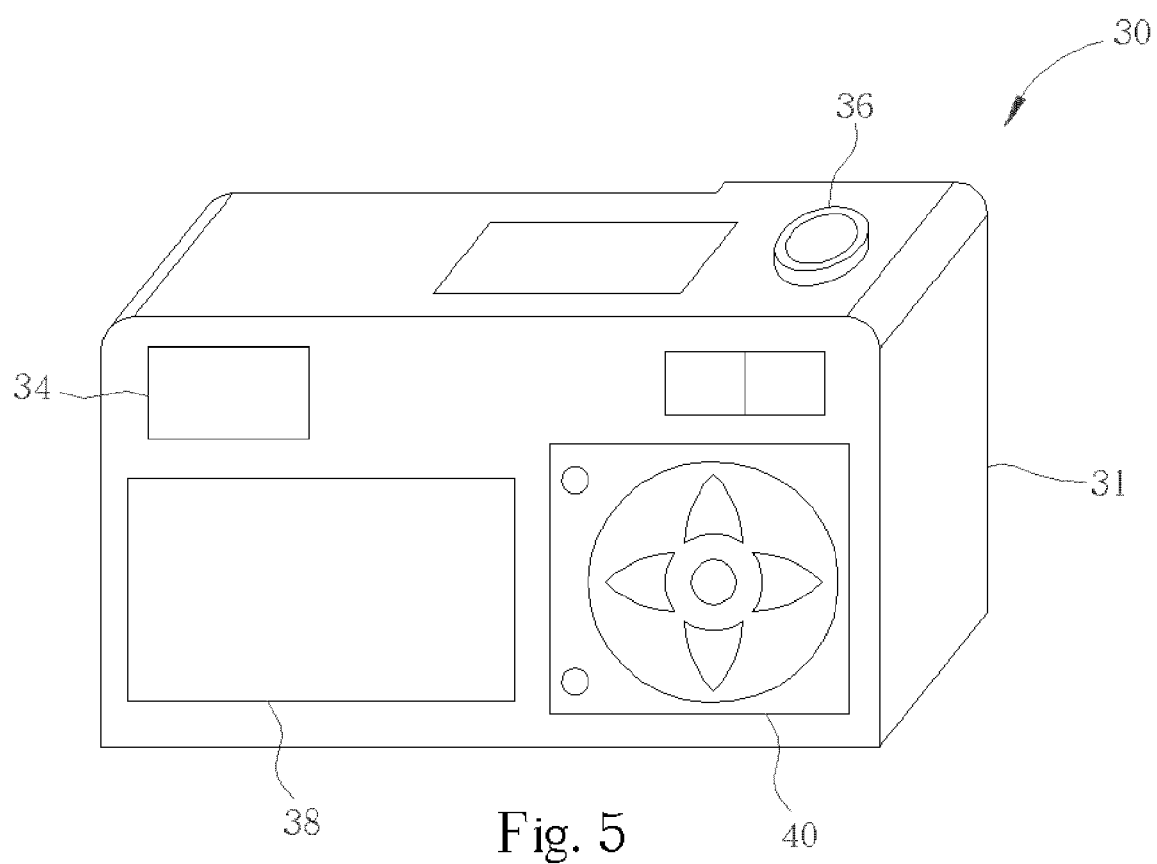
FIG. 5 is a rear view of a digital camera according to the present invention.

Please refer to FIG. 4 showing a front view, and FIG. 5 showing a rear view of a digital camera 30 according to the present invention. The digital camera 30 includes a housing 31, a first hole 32, and a shutter button 36. The first hole 32 is installed on the front side of the housing 31 for inputting light from the front of the housing 31.

The shutter button 36 is for controlling focusing and shooting. The digital camera 30 further includes a viewfinder 38, a second hole 34, and a control button set 40 for image editing, browsing, and parameter settings.

The viewfinder 38 can be an LCD or an LPTS display for viewing an object. The second hole 34 is installed on the backside of the housing 31 for inputting light from the rear of the housing 31. Both the first hole 32 and the second hole 34 are covered by a transparent material to prevent the entry of dust.

Figure 6:
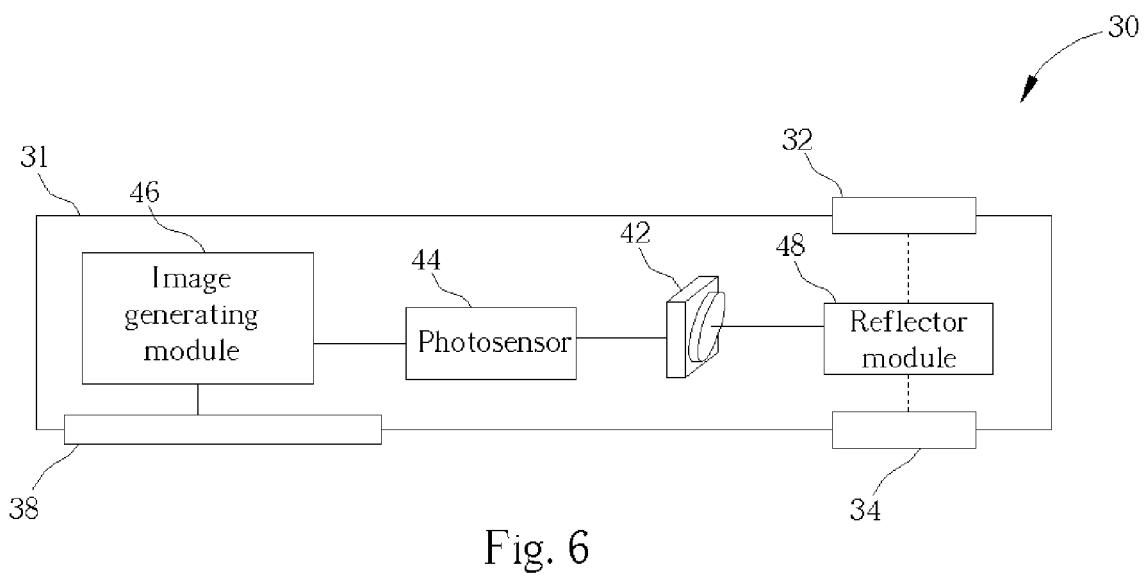
FIG. 6 is a block diagram of a digital camera according to the present invention.

Please refer to FIG. 6 showing a block diagram of the digital camera 30. The digital camera 30 includes a reflector module 48, a lens group 42, a photosensor 44, and an image generating module 46 installed in the housing 31. The reflector module 48 is for reflecting the light from the first hole 32 or the second hole 34. The lens group 42 is for focusing the light from the reflector module 48 on the photosensor 44. The photosensor 44 is for sensing the light from the lens group 42. And the image generating module 46 is for generating an image according to the light sensed by the photosensor 44 so that the viewfinder 38 can display the image.

Figure 7:
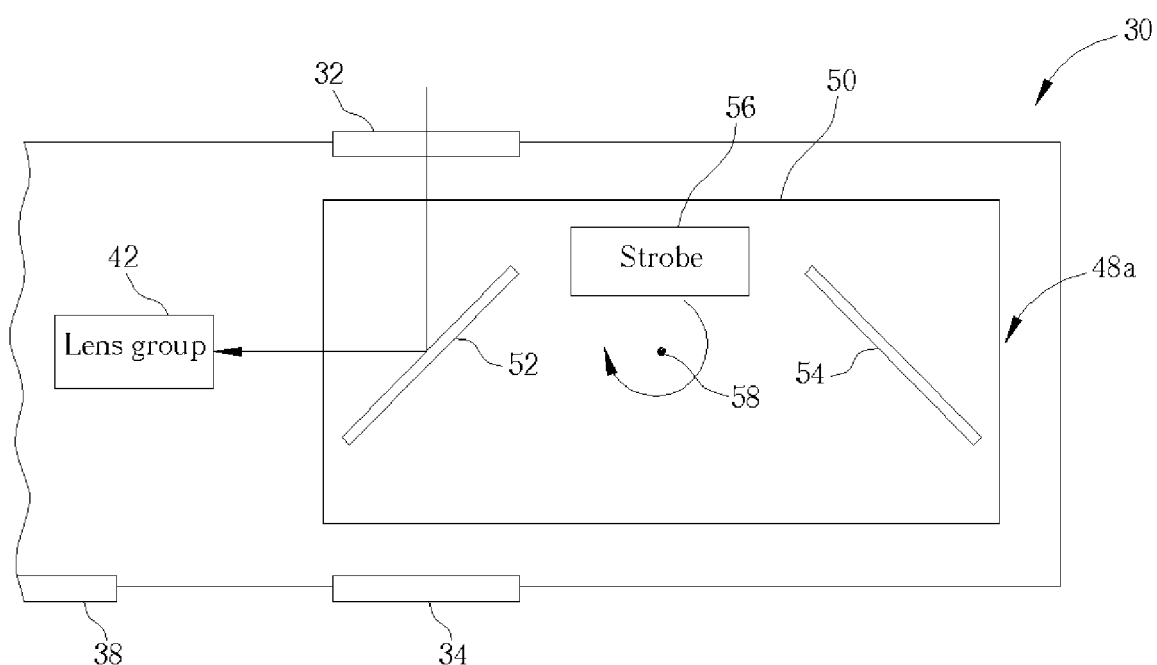
FIG. 7 illustrates the reflector module reflecting light from the first hole according to the first embodiment of the present invention.
Figure 8:
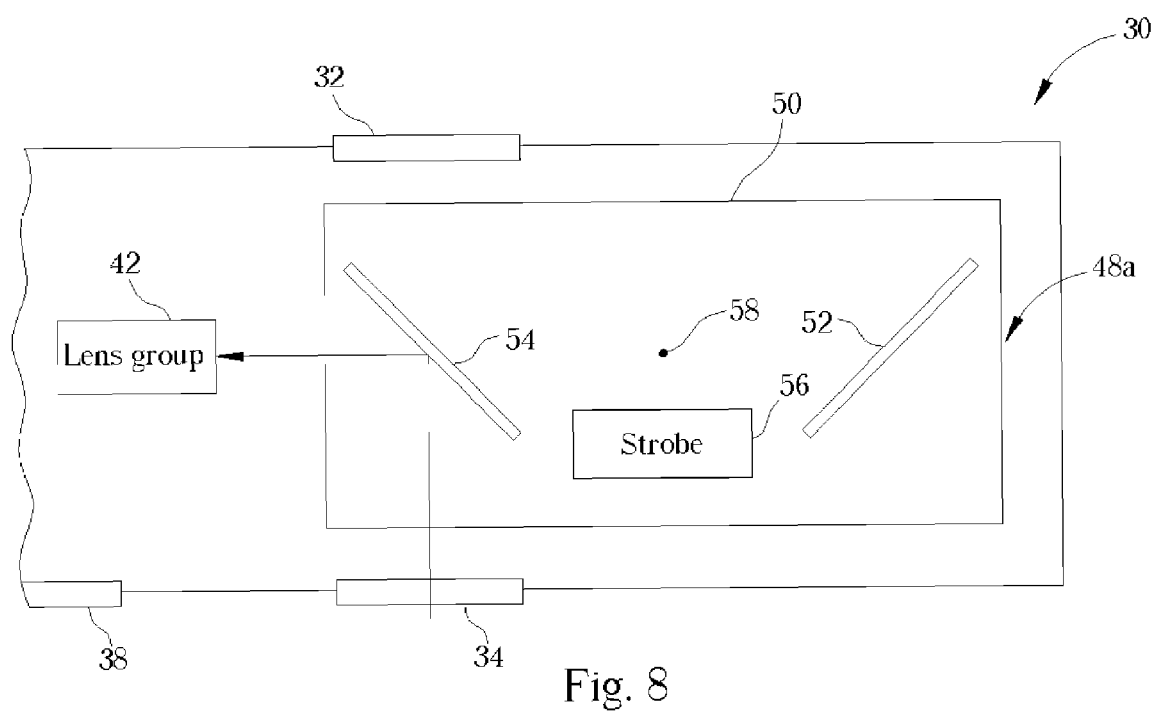
FIG. 8 illustrates the reflector module in FIG. 7 reflecting light from the second hole according to the first embodiment of the present invention.

The present invention discloses several embodiments of the reflector module 48 as follows. Please refer to FIG. 7 showing the reflector module 48 reflecting light from the first hole 32, and FIG. 8 showing the reflector module 48a in FIG. 7 reflecting light from the second hole 34 according to the first embodiment of the present invention. The reflector module 48a includes a pedestal 50, a first reflector 52, a second reflector 54, and a strobe 56. The pedestal 50 rotates around a first axis 58. The first reflector 52 is installed on a first side of the pedestal 50 for reflecting the light from the first hole 32. The second reflector 54 is installed on a second side of the pedestal 50 for reflecting the light from the second hole 34. The strobe 56 is installed along the front of the pedestal 50 and between the two reflectors 52, 54, and is turned along with the pedestal 50 for providing a light source necessary for the digital camera 30. In the present embodiment, the first axis 58 is perpendicular to the pedestal 50, and the pedestal 50 rotates clockwise or counterclockwise around the first axis 58. The normal lines of the first reflector 52 and the second reflector 54 cross at right angles. When capturing an object visible from the first hole 32, the reflector module 48a is turned as in FIG. 7, and the first reflector 52 reflects the light from the first hole 32 to the lens group 42. The photosensor 44 and the image generating module 46 in FIG. 6 then process the image to display it on the viewfinder 38. Similarly, when capturing an object visible from the second hole 34, the pedestal 50 carrying the reflector module 48a is turned around the first axis 58 as in FIG. 8, and the second reflector 54 reflects the light from the second hole 34 to the lens group 42. The photosensor 44 and the image generating module 46 in FIG. 6 then process the image to display it on the viewfinder 38.

Figure 9:
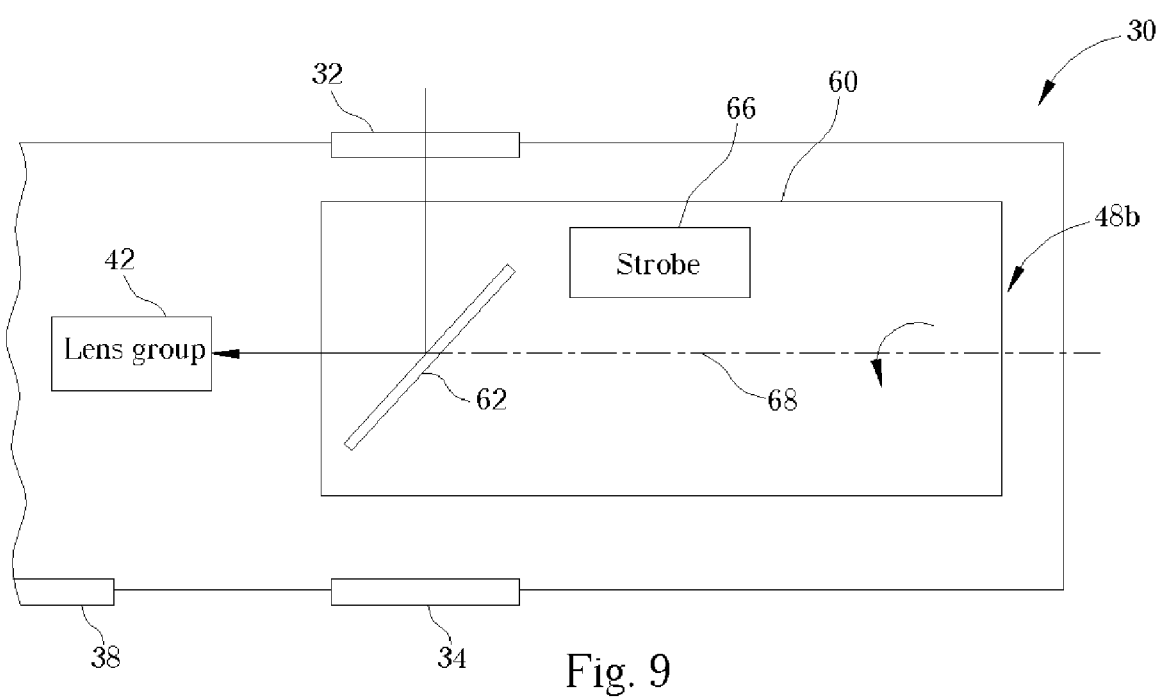
FIG. 9 illustrates the reflector module reflecting light from the first hole according to the second embodiment of the present invention.
Figure 10:
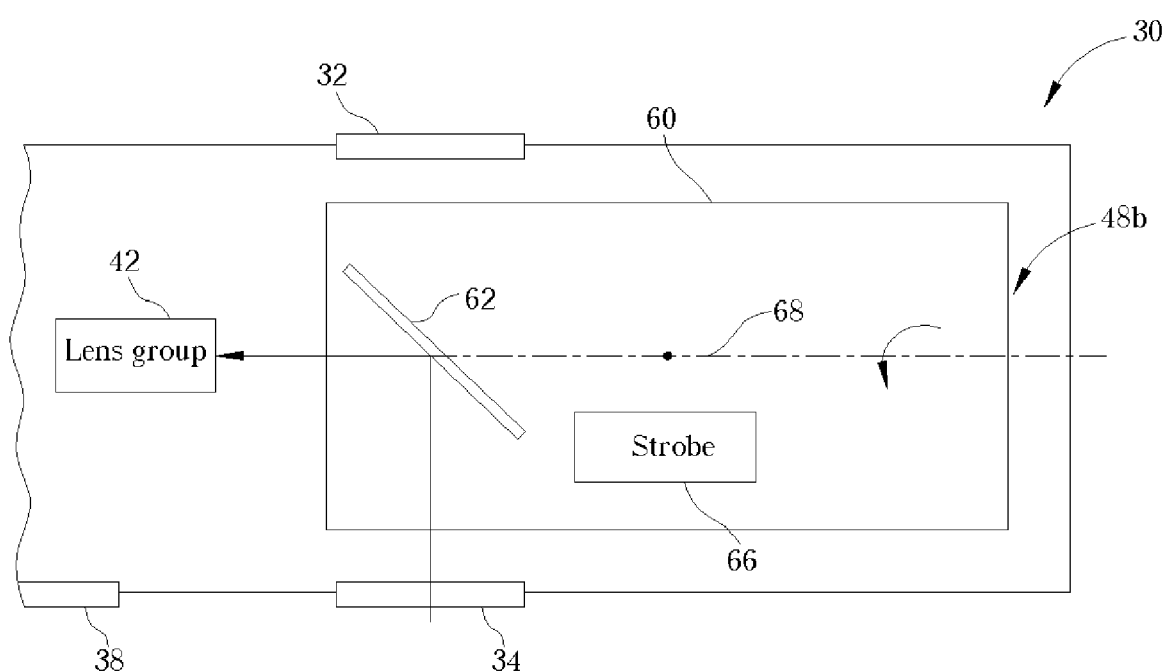
FIG. 10 illustrates the reflector module in FIG. 9 reflecting light from the second hole according to the second embodiment of the present invention.

Please refer to FIG. 9 showing a reflector module 48b reflecting light from the first hole 32, and FIG. 10 showing the reflector module 48b in FIG. 9 reflecting light from the second hole 34 according to the second embodiment of the present invention. The reflector module 48b includes a pedestal 60, a reflector 62, and a strobe 66. The pedestal 60 rotates around a second axis 68. The reflector 62 is installed on a side of the pedestal 60 for reflecting the light from the first hole 32 or the second hole 34. The strobe 66 is installed along the front of the pedestal 60, and is turned along with the pedestal 60 for providing a light source necessary for the digital camera 30. The acute angle formed between the second axis 68 and the reflector 62 is 45 degrees. In the present embodiment, the pedestal 60 rotates clockwise or counterclockwise around the second axis 68. When capturing an object visible from the first hole 32, the reflector module 48b is turned as in FIG. 9, and the reflector 62 reflects the light from the first hole 32 to the lens group 42. The photosensor 44 and the image generating module 46 in FIG. 6 then process the image to display it on the viewfinder 38. Similarly, when capturing an object visible from the second hole 34, the pedestal 60 carrying the reflector module 48b is turned around the second axis 68 as in FIG. 10 (in this case the pedestal 60 has actually rotated to a position covering the strobe 66 and the reflector 62), and the reflector 62 reflects the light from the second hole 34 to the lens group 42. The photosensor 44 and the image generating module 46 in FIG. 6 then process the image to display it on the viewfinder 38.

Figure 11:
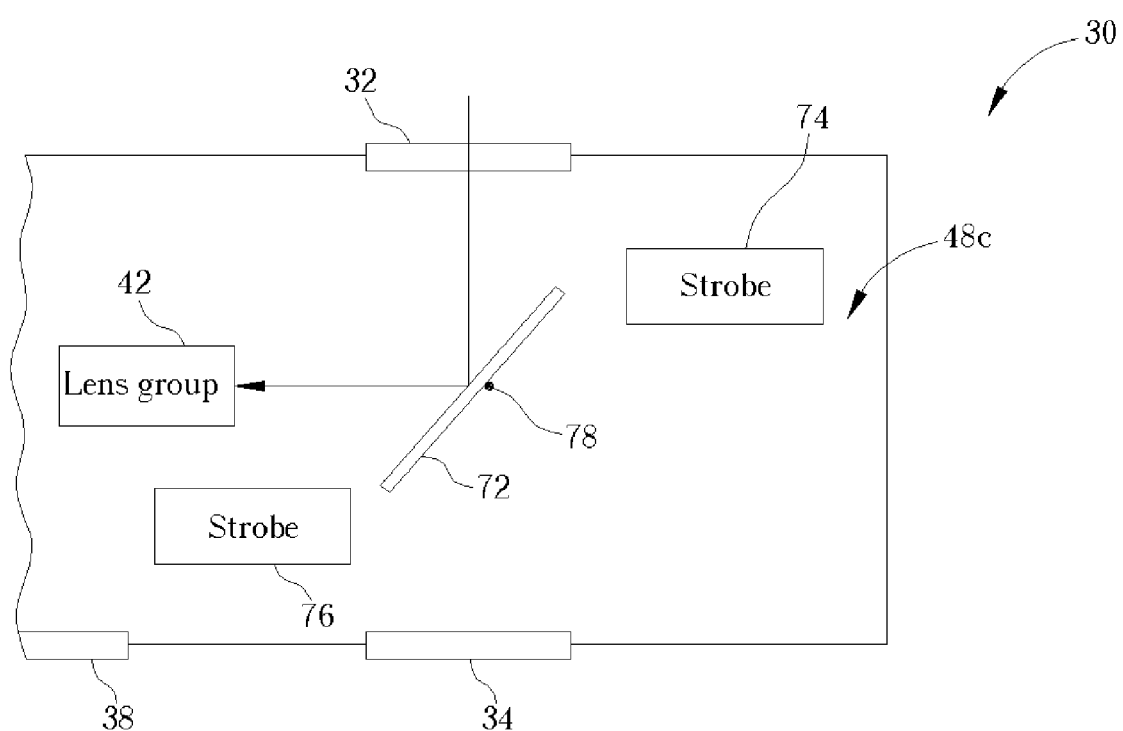
FIG. 11 illustrates the reflector module reflecting light from the first hole according to the third embodiment of the present invention.
Figure 12:
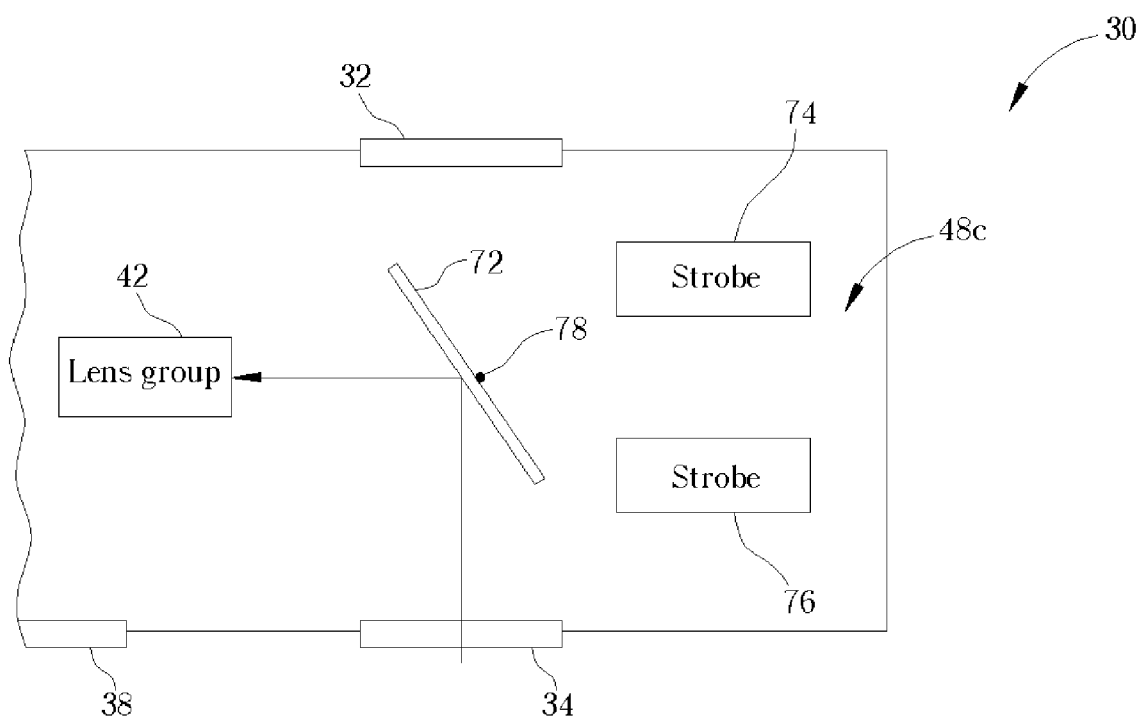
FIG. 12 illustrates the reflector module in FIG. 11 reflecting light from the second hole according to the third embodiment of the present invention.

Please refer to FIG. 11 showing a reflector module 48c reflecting light from the first hole 32, and FIG. 12 showing the reflector module 48c in FIG. 11 reflecting light from the second hole 34 according to the third embodiment of the present invention. The reflector module 48c includes a reflector 72, a first strobe 74, and a second strobe 76. The reflector 72 rotates around a third axis 78. The first strobe 74 is for providing a light source necessary for the digital camera 30 when the reflector 72 is turned to a direction for reflecting light from the first hole 32. The second strobe 76 is for providing a light source necessary for the digital camera 30 when the reflector 72 turns to a direction for reflecting light from the second hole 34. The third axis 78 is perpendicular to the normal line of the reflector 72. In the present embodiment, the reflector 72 rotates clockwise or counterclockwise around the third axis 72. When capturing an object visible from the first hole 32, the reflector module 48c is turned as in FIG. 11, and the reflector 72 reflects the light from the first hole 32 to the lens group 42. The photosensor 44 and the image generating module 46 in FIG. 6 then process the image to display it on the viewfinder 38. Similarly, when capturing an object visible from the second hole 34, the reflector 72 is turned around the third axis 78 as in FIG. 12, and the reflector 72 reflects the light from the second hole 34 to the lens group 42.The photosensor 44 and the image generating module 46 in FIG. 6 then process the image to display it on the viewfinder 38.

Figure 13:
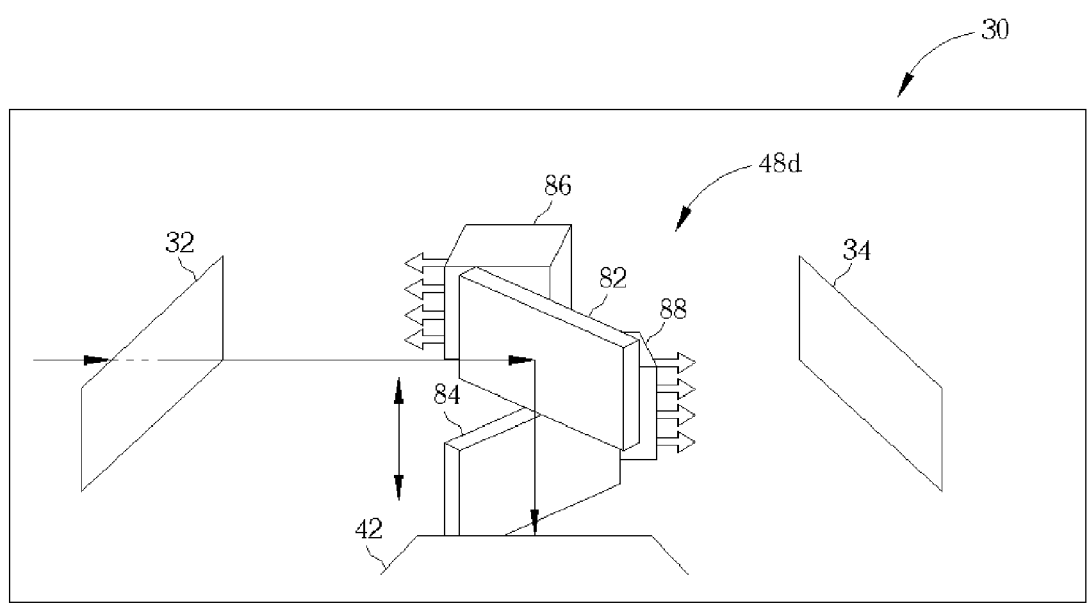
FIG. 13 illustrates the reflector module reflecting light from the first hole according to the fourth embodiment of the present invention.
Figure 14:
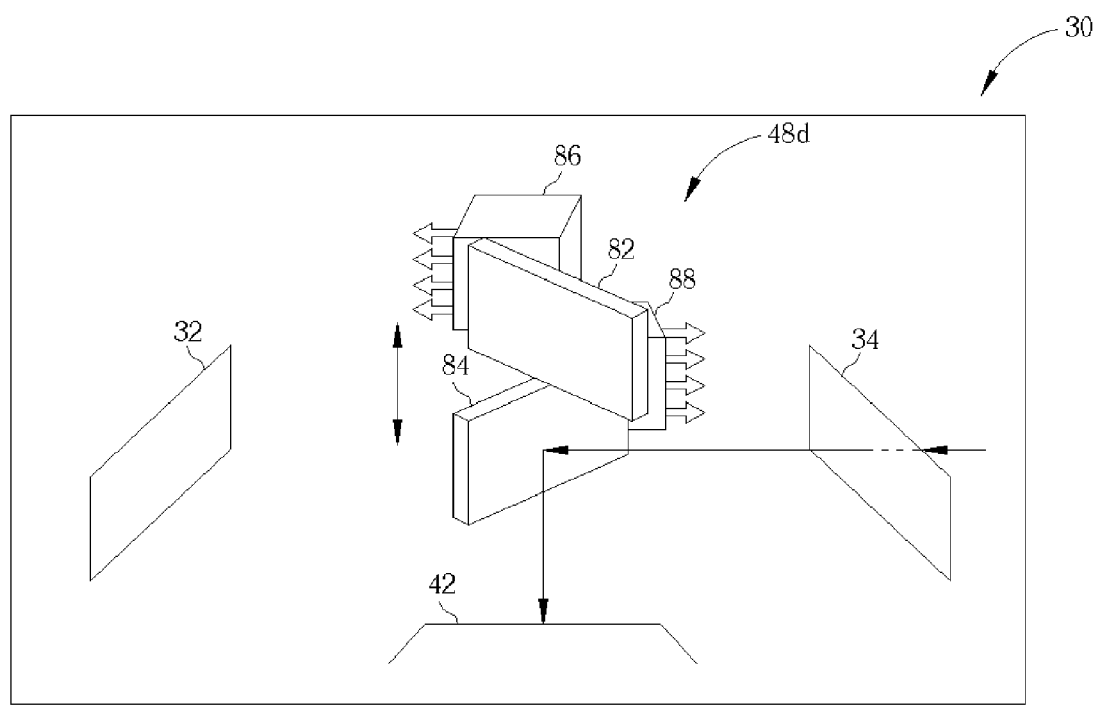
FIG. 14 illustrates the reflector module in FIG. 13 reflecting light from the second hole according to the fourth embodiment of the present invention.

Please refer to FIG. 13 showing a reflector module 48d reflecting light from the first hole 32, and FIG. 14 showing the reflector module 48d in FIG. 13 reflecting light from the second hole 34 according to the fourth embodiment of the present invention. The reflector module 48d includes a first reflector 82, a second reflector 84, a first strobe 86, and a second strobe 88. The two reflectors 82, 84 are aligned on a line, and the normal lines of the first reflector 82 and the second reflector 84 cross at right angles. The first strobe 86 is for providing a light source necessary for the digital camera 30 when the first reflector 82 turns to a direction for reflecting light from the first hole 32. The second strobe 88 is for providing a light source necessary for the digital camera 30 when the second reflector 84 turns to a direction for reflecting light from the second hole 34. The two reflectors 82, 84 and the two strobes 86, 88 can move up and down toward the lens group 42, in order to receive the light reflected by the first reflector 82 or the second reflector 84, respectively.

In addition, since the conventional digital camera 10 uses the expanding and contracting of the lens 12 to focus the light on the photosensor 24, the thickness of the digital camera 10 cannot be effectively reduced. Differing from the conventional digital camera 10, the present invention uses the reflector module 48 to reflect the light to the lens group installed on the right or left side of the camera, instead of the backside. Therefore the thickness is reduced.

Figure 15:
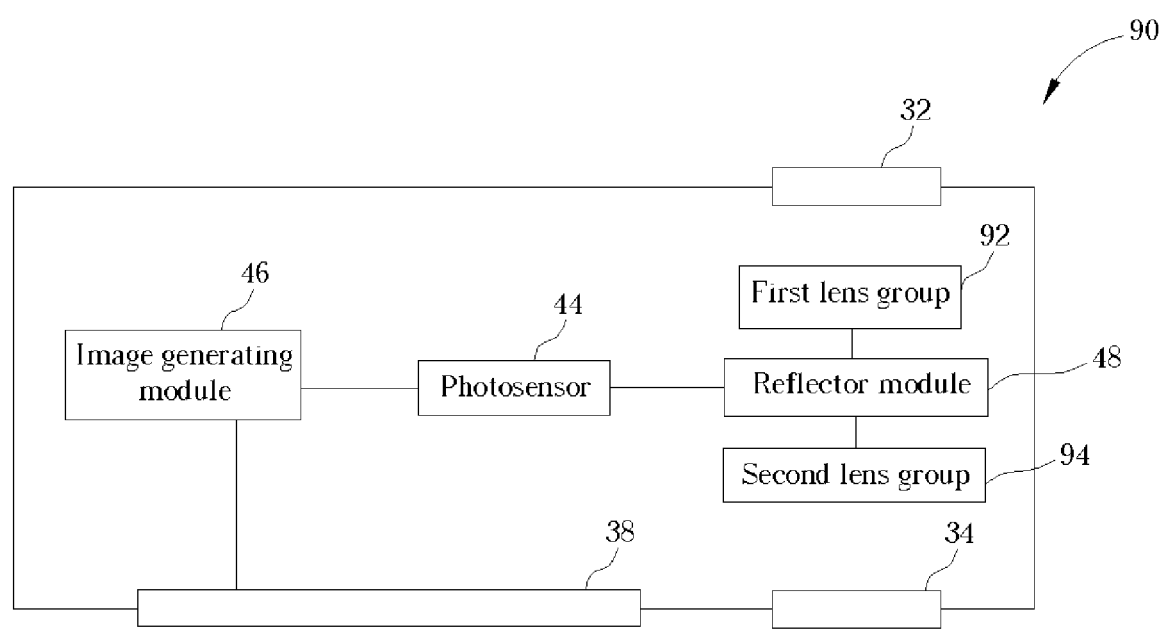
FIG. 15 is a block diagram of a digital camera according to the second embodiment of the present invention.

Please refer to FIG. 15 showing a block diagram of a digital camera 90 according to the second embodiment of the present invention. The digital camera 90 includes a reflector module 48, a first lens group 92, a second lens group 94, a photosensor 44, an image generating module 46, and a viewfinder 38. Devices in FIG. 15 with the same number as that in FIG. 6 function the same way and a repeated description is thereby omitted. However, the difference between the two cameras is that, the digital camera 90 has two lens groups 92, 94, wherein the first lens group 92 is installed between the first hole 32 and the reflector module 48 for focusing the light from the first hole 32 on the photosensor 44.The second lens group 94 is installed between the second hole 34 and the reflector module 48 for focusing the light from the second hole 34 on the photosensor 44.The photosensor 44 and the image generating module 46 in FIG. 6 then convert the light from the first hole 32 or the second hole 34 into an image to display it on the viewfinder 38.

Figure 16:
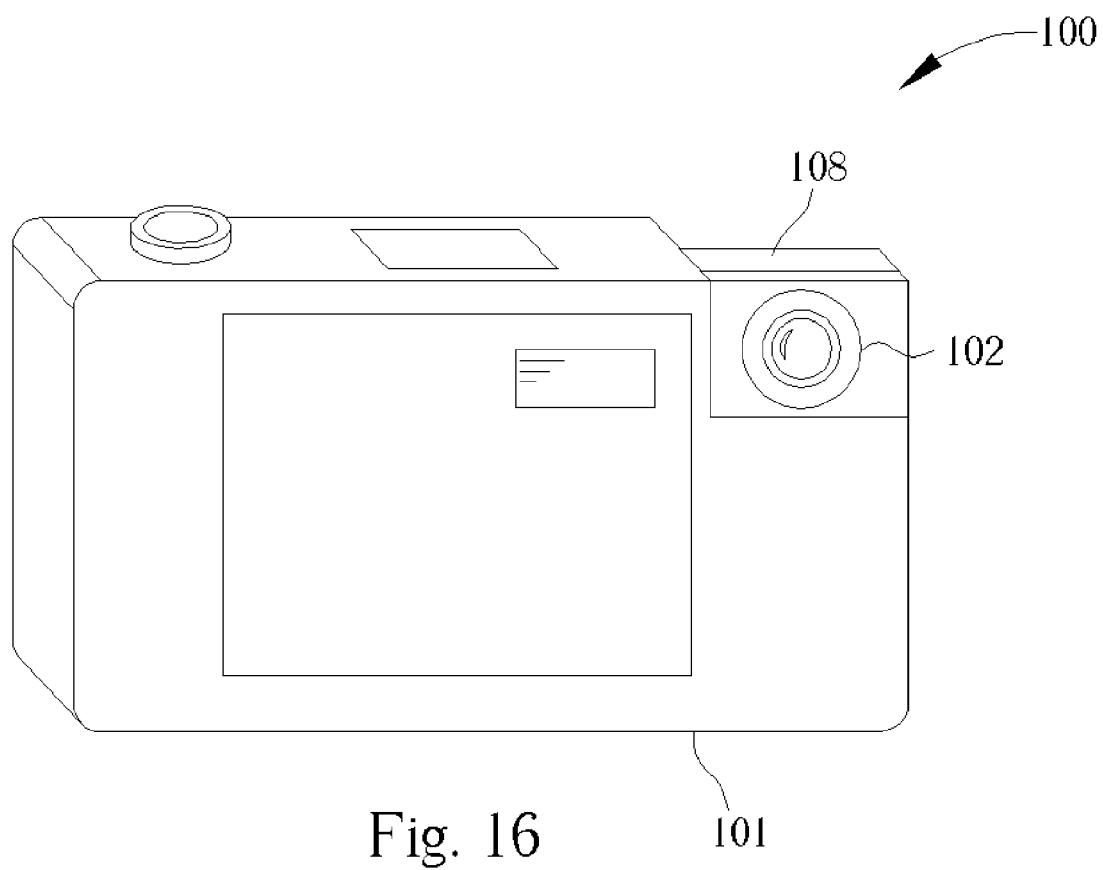
FIG. 16 illustrates a digital camera according to the third embodiment of the present invention.
Figure 17:
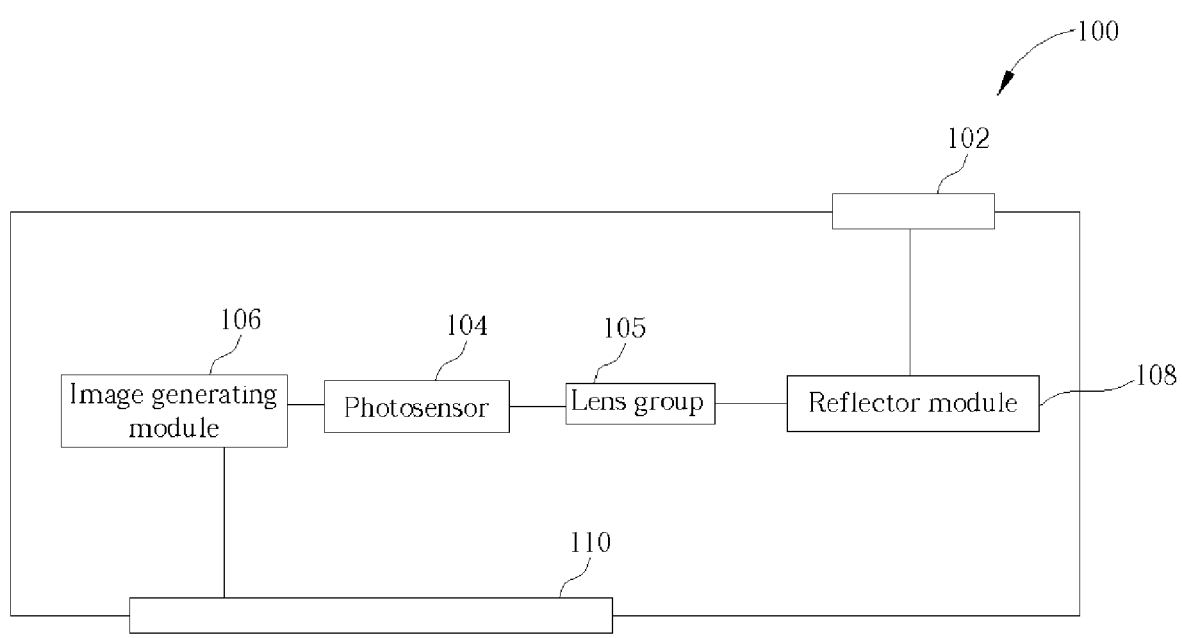
FIG. 17 is a block diagram of the digital camera according to the third embodiment of the present invention.

Please refer to FIG. 16 showing a digital camera 100, and FIG. 17 showing a block diagram of the digital camera 100 according to the third embodiment of the present invention. The digital camera 100 includes a housing 101, a lens 102, a photosensor 104, a lens group 105, an image generating module 106, a reflector module 108, and a viewfinder 110.

The lens 102 is installed on the housing 101 and can move back and forth, for inputting light from the front or the rear of the housing 101. The reflector module 108 is for reflecting the light input by the lens 102. The lens group 105 is installed between the reflector module 108 and the photosensor 104 for focusing the light from the reflector module 108 onto the photosensor 104. The photosensor 104 is installed in the housing 101 for sensing the light from the lens group 105. The image generating module 106 is installed in the housing 101 for generating an image according to the light sensed by the photosensor 104. Finally, the viewfinder 110 displays the image generated by the image generating module 106.

Figure 18:
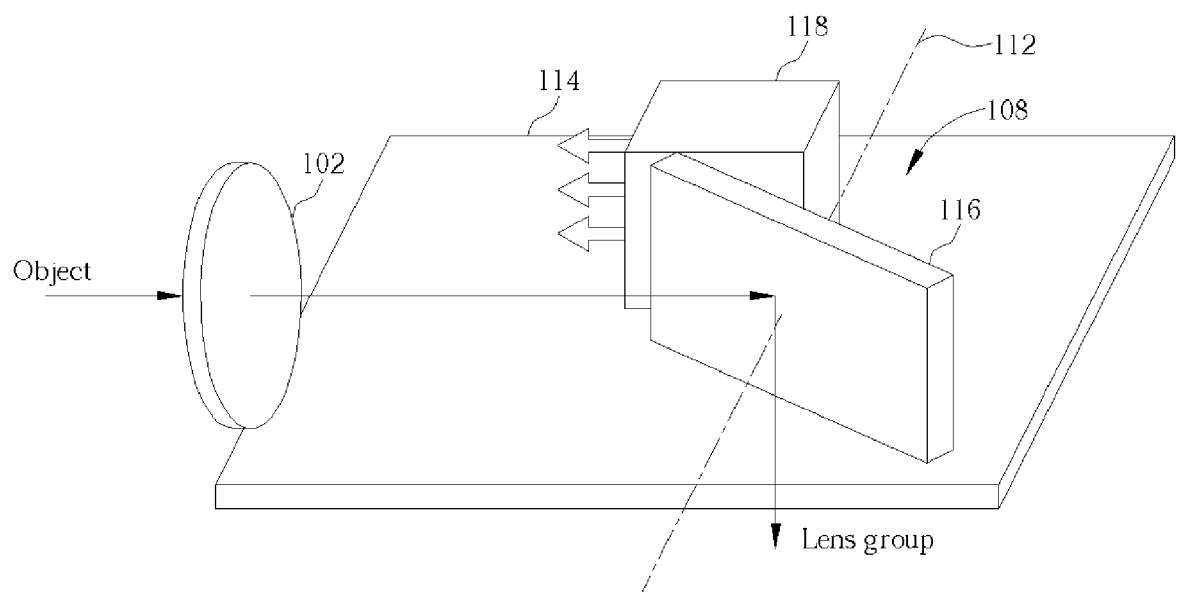
FIG. 18 is a perspective view of the lens and the reflector module in FIG. 16.
Figure 19:
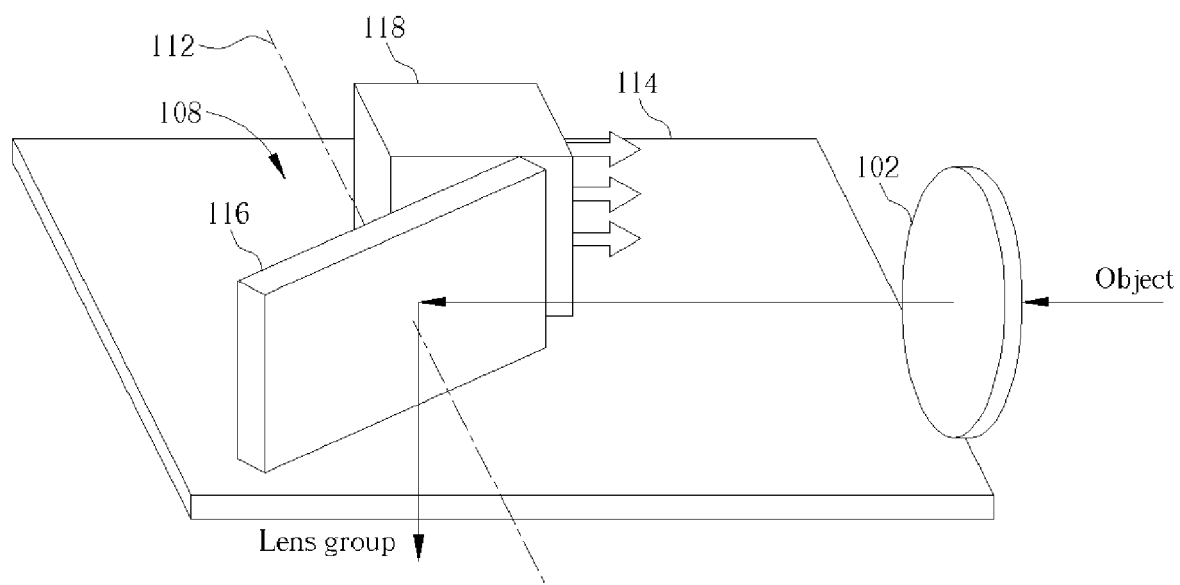
FIG. 19 is a perspective view of the lens and the reflector module positioned on a fourth axis.

Please refer to FIG. 18 showing a perspective view of the lens 102 and the reflector module 108 in FIG. 16, and FIG. 19 showing a perspective view of the lens 102 and the reflector module 108 rotated around a fourth axis 112. The reflector module 108 includes a pedestal 114, a reflector 116, and a strobe 118. The strobe 118 is installed on the pedestal 114 and can turn along with the pedestal 114, for providing a light source necessary for the digital camera 100. When capturing an object visible from the front, the lens 102 and the reflector module 108 are turned as in FIG. 18, the light from the object passes through the lens 102 and is reflected by the reflector 116 to the lens group, and is then processed by the photosensor 44 and the image generating module 46 to be displayed on the viewfinder 38. Similarly when capturing an object visible from the back, the lens 102 and the reflector module 108 are turned on the fourth axis 112 as in FIG. 19.The lens 102 receives light from the object, the reflector 116 reflects the light to the lens group, and the photosensor 44 and the image generating module 46 then process the image to display it on the viewfinder 38. In such a manner, by only turning the lens 102 and the reflector module 108, an object in front or in back can be captured.

Figure 20:
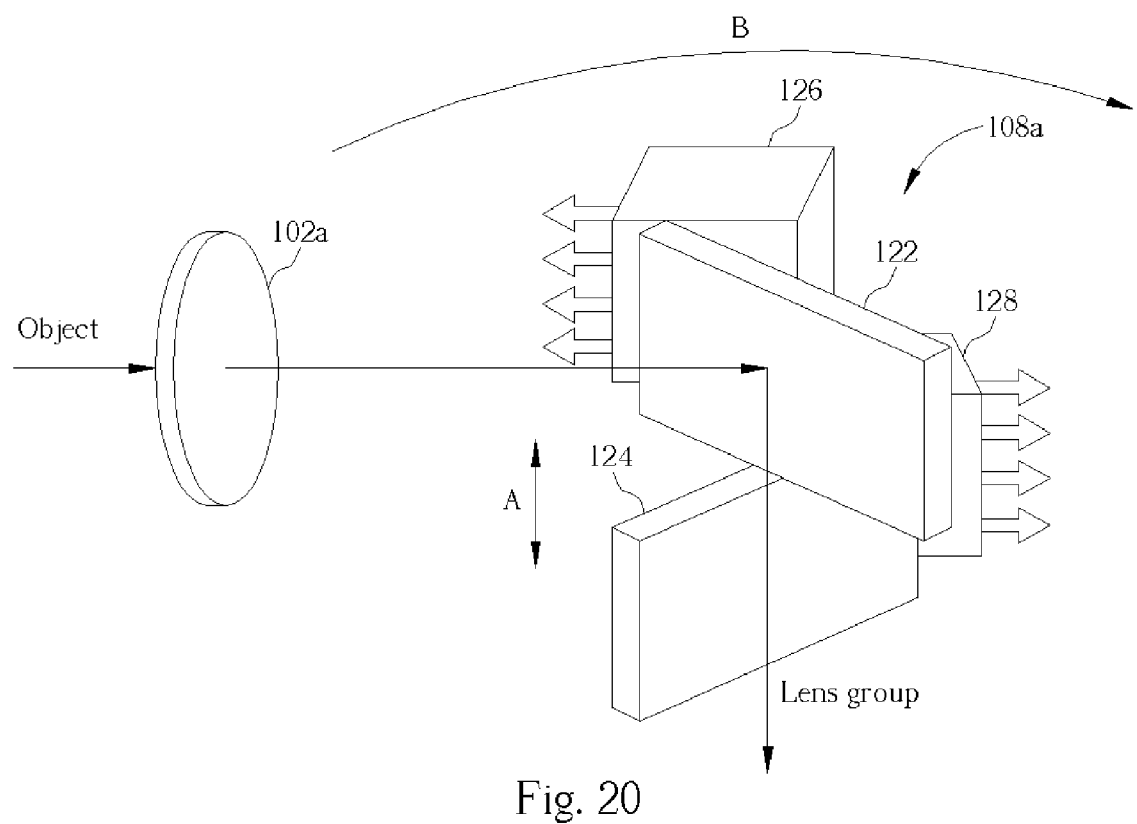
FIG. 20 is a perspective view of the lens and the reflector module in FIG. 16 according to another embodiment of the present invention.
Figure 21:
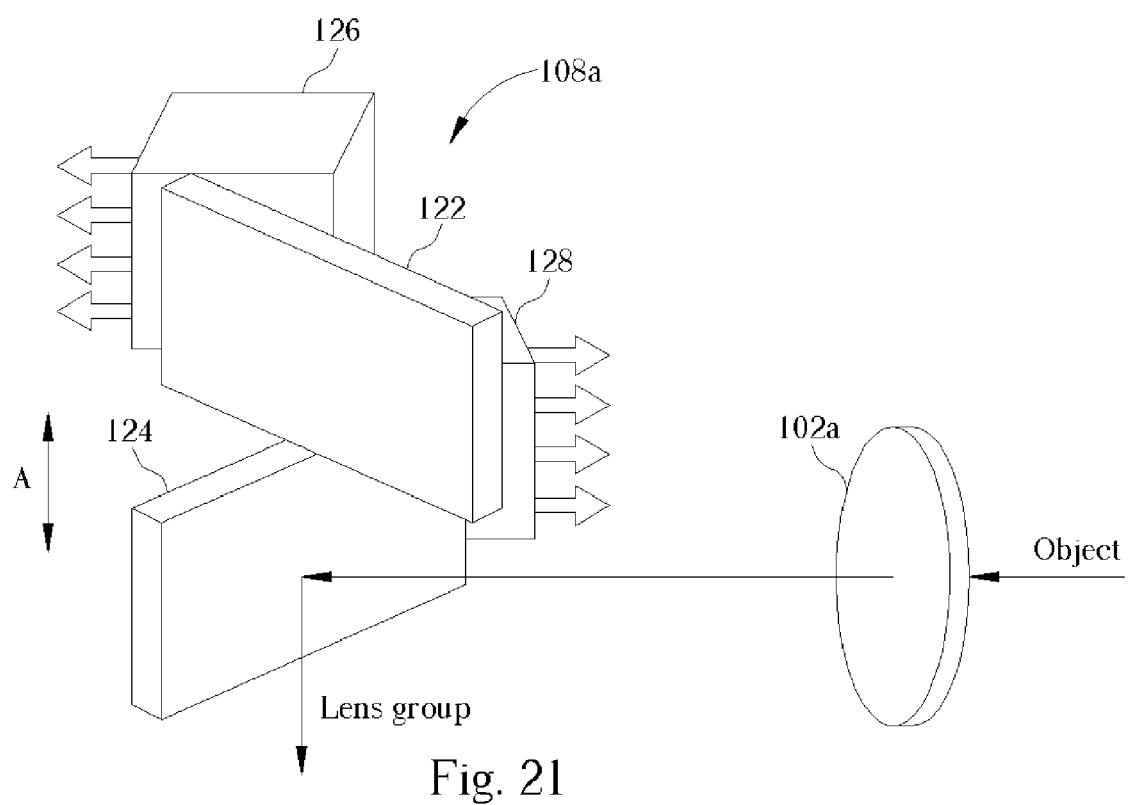
FIG. 21 is a perspective view of the reflector module in FIG. 20 moved along arrow A and the lens moved along arrow B according to another embodiment of the present invention.
Figure 22:
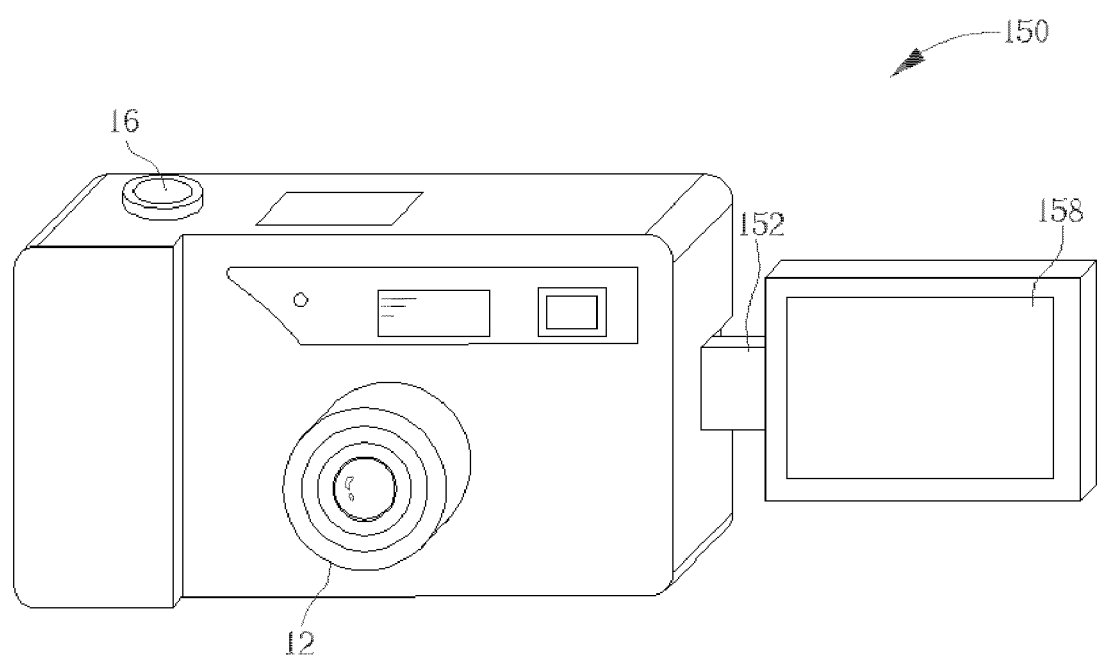
FIG. 22 illustrates another conventional digital camera.

Please refer to FIG. 20 showing a perspective view of the lens 102 and the reflector module 108 in FIG. 16, and FIG. 21 showing a perspective view of the reflector module 108a in FIG. 20 moved along arrow A and the lens 102a moved along arrow B according to another embodiment of the present invention. The reflector module 108a includes a first reflector 122, a second reflector 124, a first strobe 126, and a second strobe 128. The two reflectors 122, 124 are aligned, and the normal lines of the first reflector 122 and the second reflector 124 cross at right angles. The first strobe 126 is for providing a light source necessary for the digital camera 100 when the first reflector 122 is turned to a direction for reflecting light from the lens 102a to the lens group. The second strobe 128 is for providing a light source necessary for the digital camera 100 when the second reflector 124 is turned to a direction for reflecting light from the lens 102a to the lens group. When capturing an object visible from the front, the lens 102a and the reflector module 108a are turned as in FIG. 20, the light from the object passes through the lens 102a and is reflected by the first reflector 122 to the lens group, and is then processed by the photosensor 44 and the image generating module 46 to be displayed on the viewfinder 38. Similarly, when capturing an object visible from the rear, the lens 102a is moved along arrow B in FIG. 20 and the reflector module 108a is moved along arrow A as in FIG. 21.The lens 102a receives light from the object, the second reflector 124 reflects the light to the lens group, and the photosensor 44 and the image generating module 46 then process the image to display it on the viewfinder 38. In such a manner, by only turning the lens 102a and moving the reflector module 108a, an object in front or in back can be captured.

The digital camera is only an example of the present invention. The present invention can also be applied in other digital image apparatuses such as a digital camcorder.

In contrast to the prior art, the digital image capturing apparatus according to the present invention uses the reflector module to reflect light from the first hole or the second hole, so that the digital image capturing apparatus can capture an image of an object in front, in back, or even in any other position relative to the digital image capturing apparatus. The present invention does not use an inexpensive hinge. Additionally, the lens group receives the light reflected by the first hole or the second hole, so that the lens can be installed on the right or left side of the digital image capturing apparatus instead of the backside, in order to reduce the thickness of the digital image capturing apparatus.

Those skilled in the art will readily observe that numerous modifications and alterations of the device may be made while retaining the teachings of the invention. Accordingly, the above disclosure should be construed as limited only by the metes and bounds of the appended claims.

The invention claimed is:

1. A digital image capturing apparatus comprising:
   a housing;
   a first hole installed on the front side of the housing capable of receiving light from the front, the first hole having a first central axis;
   a second hole installed on the rear side of the housing capable of receiving light from the rear, the second hole having a central axis substantially parallel with the first central axis;
   a reflector module installed in the housing capable of selectively reflecting light received from the first hole or the second hole, the reflector module comprising:
      a pedestal capable of turning on a second axis;
      a reflector installed on a side of the pedestal capable of selectively reflecting light from the first hole or the second hole to a photosensor installed in the housing; and
      a strobe installed on the pedestal capable of turning with the pedestal to allow the strobe to be aimed substantially parallel with the first central axis in either direction for providing a light source for the digital image capturing apparatus; and
   an image generating module installed in the housing capable of generating an image according to the light sensed by the photosensor.

2. The digital image capturing apparatus of claim 1, further comprising a lens group installed between the reflector module and the photosensor capable of focusing the light from the reflector module onto the photosensor.

3. The digital image capturing apparatus of claim 1, further comprising a first lens group installed between the first hole and the reflector module capable of focusing the light from the first hole onto the photosensor, and a second lens group installed between the second hole and the reflector module capable of focusing the light from the second hole onto the photosensor.

4. The digital image capturing apparatus of claim 1, wherein the acute angle formed by the second axis and the normal line of the reflector is 45 degrees.

5. The digital image capturing apparatus of claim 1, wherein the first hole and the second hole comprise a transparent material.

6. The digital image capturing apparatus of claim 1 wherein the apparatus comprises at least one of a digital camera and a digital camcorder.

7. The digital image capturing apparatus of claim 1, wherein the second axis is perpendicular to a shortest line connecting the front side of the housing to the rear side of the housing.

8. The digital image capturing apparatus of claim 7, wherein an angle formed by the second axis and a normal line of the reflector comprises approximately 45 degrees, and wherein an angle formed by the second axis and a line along which the strobe is aimed comprises approximately 90 degrees.

9. The digital image capturing apparatus of claim 1, wherein the second axis is perpendicular to the first central axis.

10. The digital image capturing apparatus of claim 1, further comprising:
    a shutter button coupled to the housing, the shutter button capable of controlling shooting of a digital image;
    a viewfinder coupled to the housing, the viewfinder capable of viewing an object; and
    one or more control buttons coupled to the housing, the one or more control buttons capable of controlling image editing, browsing, and/or parameter setting.

11. A digital image capturing apparatus comprising:
    a housing;
    a lens installed on the housing, wherein the lens is capable of moving between a first position and a second position, capable of receiving light from the front of the housing in the first position and from the rear of the housing in the second position;
    a reflector module installed in the housing capable of reflecting the light input from the lens, the reflector module comprising:
       a pedestal capable of turning on an axis;
       a reflector installed on a side of the pedestal capable of reflecting light from the lens to the photosensor; and
       a strobe installed on the pedestal and turnable wherein the pedestal is capable of allowing the strobe to be aimed substantially parallel with the lens for providing a light source to the digital image capturing apparatus;
    a photosensor installed in the housing for sensing light from the reflector module; and
    an image generating module installed in the housing capable of generating an image according to the light sensed by the photosensor.

12. The digital image capturing apparatus of claim 11, further comprising a lens group installed between the reflector module and the photo sensor capable of focusing the light from the reflector module onto the photosensor.

13. The digital image capturing apparatus of claim 11, wherein the reflector module is installed in the housing and is capable of moving along with the lens.

14. The digital image capturing apparatus of claim 11, wherein the acute angle formed by the axis and the normal line of the reflector is 45 degrees.

15. The digital image capturing apparatus of claim 11, wherein the apparatus comprises at least one of a digital camera and a digital camcorder.

16. A digital image capturing apparatus comprising:
    a housing comprising a front side and an opposite rear side, and a first central axis as a shortest line connecting the front side and the rear side;
    a reflector module installed in the housing capable of reflecting light received at the front side of the housing when the reflector module is in a first position and further capable of reflecting light received at the read side of the housing when the reflector module is in a second position, the reflector module comprising:

a pedestal capable of turning on a second axis, the second axis being perpendicular to the first central axis, the pedestal capable of turning between the first and second positions;

a reflector installed on the pedestal and capable of turning with the pedestal to allow the reflector to reflect-light from the front or rear side of the housing to the photosensor; and a strobe installed on the pedestal and capable of turning with the pedestal to allow the strobe to be aimed substantially parallel with the first central axis in either direction for providing a light source for the digital image capturing apparatus;

a photosensor installed in the housing capable of sensing the light from the reflector module; and an image generating module installed in the housing capable of generating an image according to the light sensed by the photosensor.

* * * * *

UNITED STATES PATENT AND TRADEMARK OFFICE
CERTIFICATE OF CORRECTION

PATENT NO. : 7,375,759 B2  Page 1 of 1
APPLICATION NO. : 10/707949
DATED : May 20, 2008
INVENTOR(S) : Lin It is certified that error appears in the above-identified patent and that said Letters Patent is hereby corrected as shown below:

On the Title Page
Item (56) OTHER PUBLICATIONS, change
"http://www.macdirectory.com/newmd/mac/pages/reviews/MinolataX20/" to
--http://www.macdirectory.com/newmd/mac/pages/reviews/MinoltaX20/--

Signed and Sealed this

Sixth Day of October, 2009

David J. Kappos
*Director of the United States Patent and Trademark Office*